United States Patent [19]

Linton

[11] Patent Number: 4,458,582
[45] Date of Patent: Jul. 10, 1984

[54] AUTOMATIC RIGGING ARRANGEMENT FOR ACTUATION SYSTEMS

[75] Inventor: David J. Linton, Rockford, Ill.

[73] Assignee: Sundstrand Corporation, Rockford, Ill.

[21] Appl. No.: 434,777

[22] Filed: Oct. 18, 1982

[51] Int. Cl.³ .............................................. F01B 3/02
[52] U.S. Cl. ................................... 91/506; 91/466
[58] Field of Search .................... 91/506, 404, 405; 60/226.1, 226.2, 226.3, 230, 443, 444, 388, 392, 466

[56] References Cited

U.S. PATENT DOCUMENTS

| 3,655,134 | 4/1972 | Greenland et al. | 60/230 X |
| 3,931,944 | 1/1976 | Capewell et al. | 60/230 X |
| 4,191,094 | 3/1980 | Flippo | 417/217 X |
| 4,210,066 | 7/1980 | Aldrich | 91/506 |

*Primary Examiner*—Edward K. Look
*Attorney, Agent, or Firm*—Harold A. Williamson; Michael B. McMurry; Ted E. Killingsworth

[57] ABSTRACT

The invention relates to an automatic rigging arrangement for an actuation system wherein the rigging arrangement includes in combination a differential length feedback device that has a moveable inner member and an outer member, with the outer member secured at its ends respectively to a power drive unit and an actuator, the moveable inner member being controllingly coupled to a power drive control and secured to an actuator position feedback member of the actuator to thereby provide via the moveable member of an actuator position feedback input signal to a signal summing means associated with the power drive control. The feedback input signal being proportional to an actuator position and the signal summing means being responsively coupled to the power drive unit to receive as an input, a signal representative of a given position commanded. The signal summing means having an output that is a function of the signal representative of the position commanded and the feedback signal with the signal summing means output controls the power drive unit and therefore the actuator irrespective of the actuator and its mounting position in respect of the location of the power drive unit.

7 Claims, 3 Drawing Figures

AUTOMATIC RIGGING ARRANGEMENT FOR ACTUATION SYSTEMS

TECHNICAL FIELD

This invention relates to an automatic rigging arrangement for an actuation system and its power drive unit.

BACKGROUND ART

There has long existed a problem that arises during the installation of mechanical actuation systems and involves the need for "rigging" when the actuation system is installed. "Rigging" as used here is a term employed to describe the timing of remotely located actuation components to a power drive unit. Systems that control the position of a device, such as, but not limited to thrust reverser C-ducts and airplane flap surfaces, must continually sense the actual position of that device by some means, such as a feedback arrangement or discrete stops or switches.

In view of the fact that it is very efficient to locate the actuators at the point of movement, and have a single drive unit remotely located, which drive unit is connected to these actuators by devices such as by mechanical shafting, the drive unit must then be timed to the actuators by some means when installed. The drive unit/actuator timing then allows the system to control operation of the flap thrust reversers or surfaces since the limits of travel or positions have been set within the drive unit with respect to the actuators.

A typical situation involving the need for rigging would arise when an actuator is to be installed on a turbofan thrust reverser system. The actuation system must control motion throughout the stroke of the thrust reverser and smoothly stop the thrust reverser door at each end of travel. The conventional approach would be to rig the system by moving the thrust reverser door to a known position, i.e., fully open or fully closed, attach the actuators, run the drive unit to its end of travel and attach the power transmission shafting. If done properly, the thrust reverser can be actuated normally.

Problems arise when errors in rigging occur and the surface, or thrust reverser door slams into their limit of travel before the drive unit reaches its limit of travel. This condition nearly always causes serious damage to the drive system or control surface and is the reason for this invention.

The prior art, typified by the patent to Greenland U.S. Pat. No. 3,655,134, teaches an arrangement that is common and from which arrangement the invention to be described hereinafter makes a fresh departure.

The patent to Greenland uses an actuator feedback to signal snubbing and stopping functions within a power drive unit (PDU). Rigging of a conventional nature as described hereinbefore is required when the actuators are attached to the PDU, since the feedback is rotary and relative in nature until the proper initial orientation is achieved. In Greenland, should the actuators be disconnected from the PDU, and the PDU inadvertently moved through several revolutions and then reconnected to the actuators, the system would be mis-rigged and damage of the type earlier described is likely upon operation. The invention of this specification avoids the possibility of mis-rigging by automatically adjusting a snubbing control valve to a PDU as a direct function of a signal representative of a PDU position commanded and an actual actuator feedback position signal.

There are other patents that may fairly be included as background art and these patents are Capewell, et al U.S. Pat. No. 3,931,944; Aldrich U.S. Pat. No. 4,210,066 and Flippo U.S. Pat. No. 4,191,094. These patents may all be characterized as falling into a single category due to basic similarities within the systems. Each of these patented actuator control systems have revolution counters within the PDU and none have actuator feedback. Accordingly, Capewell, Aldrich and Flippo will inherently operate independent of actuator position and therefore run a number of revolutions in each direction before snubbing and stopping. It should be evident therefore that proper orientation, i.e., rigging of the actuators to the actuators to the PDU is necessary for the PDU starting and stopping points to thereby coordinate the desired actuator starting and stopping points. The invention to be described more fully hereinafter avoids mis-rigging and distinguishes over these three patents in the manner enunciated in respect to the Greenland patent.

DISCLOSURE OF THE INVENTION

The invention relates to an automatic rigging arrangement for an actuation system wherein the rigging arrangement includes in combination a differential length feedback device that has a moveable inner member and an outer member, with the outer member secured at its ends respectively to a power drive unit and an actuator, the moveable inner member being controllingly coupled to a power drive control and secured to an actuator position feedback member of the actuator to thereby provide via the moveable member an actuator position feedback input signal to a signal summing means associated with the power drive control. The feedback input signal is proportional to an actuator position and the signal summing means is responsively coupled to the power drive unit to receive as an input, a signal representative of a given position commanded. The signal summing means has an output that is a function of the signal representative of the position commanded and the feedback signal. The signal summing means output controls the power drive unit and therefore the actuator irrespective of the actuator and its mounting position in respect of the location of the power drive unit.

It is therefore a primary object of the invention to provide an automatically rigged actuation system wherein any single actuation system component can be removed or replaced without the need for rigging.

Another object of the invention is to accomplish automatic rigging of an actuation system by communicating actuator position to a power drive unit by way of a feedback mechanism at the actuator and a push-pull cable to transmit a feedback signal that is utilized at the power drive unit in conjunction with an input command to position an internal snubbing valve that in turn slows the actuation system near the limits of travel to accomplish a controlled stop at the actuator end positions.

Yet another object of the invention is to utilize a shield push-pull cable as a feedback device to communicate actual actuator position to a summing device at the power drive unit and thereby provide in respect of the cable ends, a constant inverse relationship with respect to the shielded connections to the PDU and actuator, regardless of the absolute distance between the ends of the cable when mounted.

A final object of the invention is to provide a signal summing device in the form of an elongated member or summing link associated with a power drive unit to logically sum an actual actuator position feedback signal with an input command position to automatically produce an appropriate snubbing valve position for a given actuator position to control flow of fluid under pressure to a power drive unit that is mechanically coupled to an actuator.

In the attainment of the foregoing objects, the invention contemplates an automatic rigging arrangement for an actuation system which includes a power drive unit having an output mechanically coupled to an actuator mounted in a position remote from said power drive unit, and a power drive control device is controllingly coupled to said power drive unit to cause the power drive unit output to move the power drive unit output to a given position commanded. The automatic rigging arrangement includes in combination a differential length feedback means having a moveable inner member and an outer member. The outer member is secured at its ends respectively to the power drive unit and the actuator. The moveable inner member is controllingly coupled to the power drive control device and secured to an actuator position feedback member of the actuator to thereby provide via the moveable member an actuator position feedback input signal to a signal summing means associated with said power drive control device. The feedback input signal is proportional to an actuator position.

The signal summing means is responsively coupled to the power drive unit to receive as an input a signal representative of the given position commanded. The signal summing means has an output that is a function of the signal which is representative of the position commanded and the feedback signal. The signal summing means output controls the power drive unit to thereby effect control of the power drive unit and therefore the actuator irrespective of the actuator and its mounting position in respect of the location of the power drive unit.

In the preferred embodiment of the invention, the power drive unit is a two displacement, over center, wobbler controlled, axial piston type motor that has hydraulic fluid under pressure delivered thereto via a snub control valve that is controllingly coupled to the signal summing means output to thereby control the flow of hydraulic fluid to the motor in direct response to the signal summing means output.

The signal summing means of the preferred embodiment is simply an elongated member coupled at one end to the moveable member to receive the actuator feedback input signal and having its other end adapted to receive the input signal representative of the given position commanded.

The elongated member is additionally controllingly coupled at a point intermediate its ends to the snub control valve to provide a logical signal at the intermediate point, the signal summing means output to the snub control valve and thereby control the power drive motor as a function of the position commanded and the feedback signal.

Other objects and advantages of the present invention will be apparent upon reference to the accompanying description when taken in conjunction with the following drawings:

DESCRIPTION OF THE PREFERRED EMBODIMENT

Figure 1:
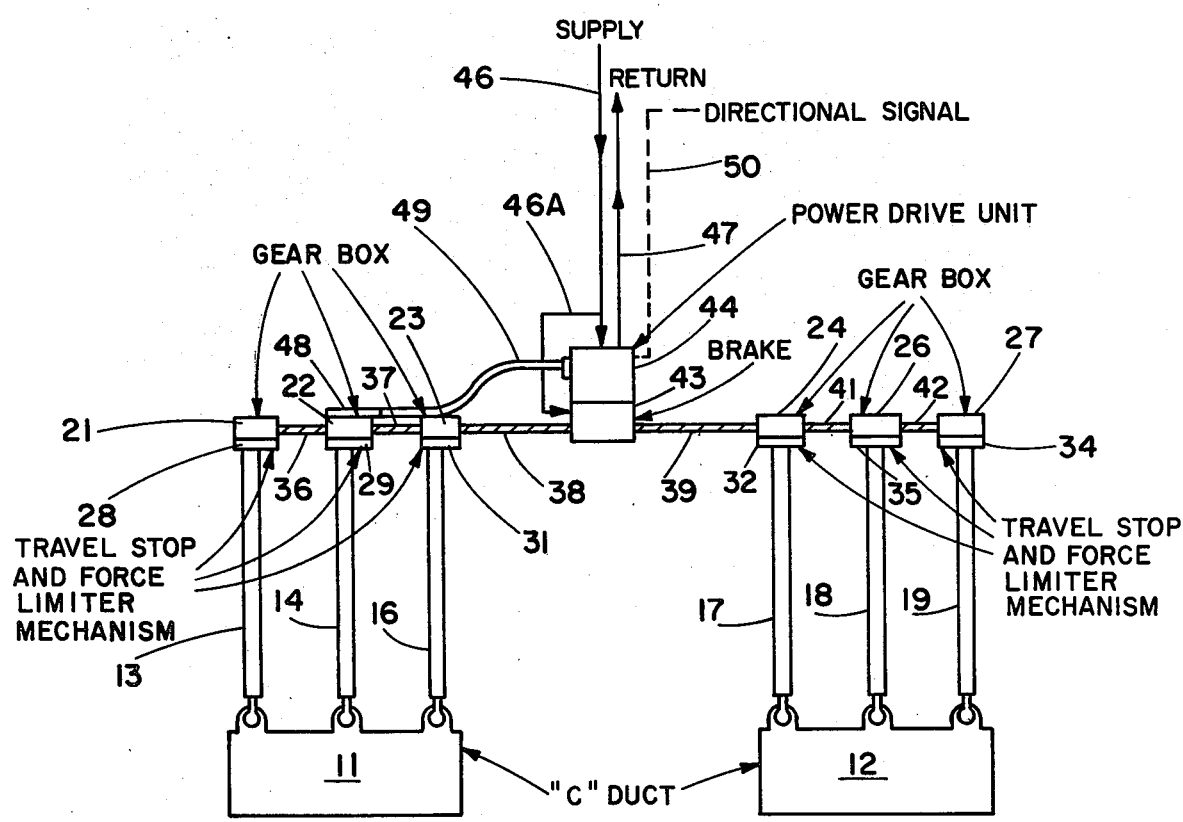
FIG. 1 illustrates a schematic arrangement embodying the invention as employed in conjunction with a power drive unit in combination with aircraft thrust reverser components.

Reference is now made to FIG. 1 which depicts in a schematic form an environment in which the invention to be described hereinafter finds utility. In this preferred embodiment there are shown schematically two components of an aircraft jet engine thrust reverser. These two components are a left "C" duct 11 and a right "C" duct 12. The configuration of the "C" ducts 11 and 12 and their relative position on the aircraft cowling can best be appreciated by studying FIG. 2. It will be observed that the left "C" duct has mechanically coupled thereto a trio of ballscrew actuator output members 13, 14 and 16. The right "C" duct 12 is similarly equipped with ballscrew actuator output members 17, 18 and 19.

Figure 2:
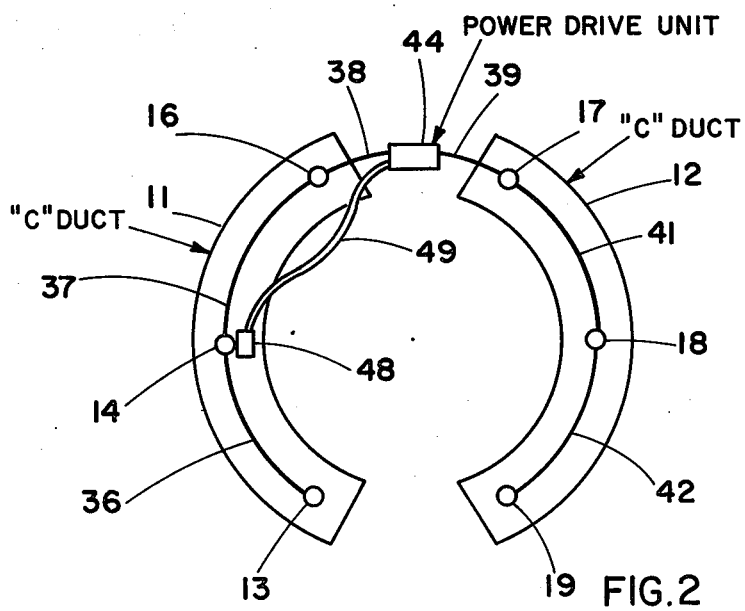
FIG. 2 depicts the spacial configuration of the various components depicted schematically in FIG. 1.

Centrally disposed as shown in FIG. 1 and FIG. 2 is a power drive unit 44 which also includes a power drive control means which will be described in detail in respect of FIG. 3. Note that the power drive unit 44 has schematically shown secured thereto a brake 43. Emanating from the brake 43 are flexible shafts 38 and 39. The shafts 38 and 39 are simultaneously driven in a manner to be described hereinafter. Positioned to the left of the power drive unit 44 are actuator gear heads 21, 22 and 23 which are mutually internally interconnected as shown by flexible shafts 36 and 37. The actuation system depicted to the right of the power drive unit 44 is similarly equipped with actuator gear heads 24, 26 and 27, and are internally interconnected by flexible shafts 41 and 42 as shown. Each of the actuator gear heads 21, 22, 23, 24, 26 and 27 have coupled thereto an over travel stop mechanisms and a force limiter generally indicated by reference numerals 28, 29, 31, 32, 33 and 34. The details of the over travel stop and the force limiters form no part of the invention, and may be selected from a number of commercially available components.

In order to describe the operation of the invention without unduly complicating the illustration, there is shown in association with the left hand "C" duct 11 and the actuator gear head 22, an actuator feedback mechanism 48 which has emanating therefrom a feedback cable assembly 49, which is mechanically coupled to a portion of the housing of the power drive unit 44. A supply conduit 46 is shown delivered to the power drive unit PDU 44 and a return conduit 47 is located as shown. The supply conduit 46 has a conduit branch 46a, which delivers hydraulic fluid under pressure to the brake 43. The details of the brake 43 form no part of the invention and are therefore not shown in detail here or hereafter. The operation is simple, in that from a point remote, such as the cockpit of the aircraft, one of two commands are delivered via dotted line 50. In this environment, the commands are either "deploy" or "stow". Hydraulic fluid under pressure delivered through line 46 to the PDU 44 causes the flexible shafts 38 and 39 to be driven simultaneously, which results in the rotary motion in the shafts 38 and 39 being converted to linear motion in the ballscrew actuator sets 13, 14, 16 and 17, 18, 19 via motion transmitted through actuator gear head set 21, 22, 23 and actuator gear head set 24, 26 and 27. Although not shown in the illustration of FIG. 1 and FIG. 2 it will be appreciated in the description that follows that a differential feedback cable assembly such as 49 could be added in respect of the right hand "C" duct 12 and its heretofore described actuation system. The nature of this additional differential feedback cable assembly not shown will be explained more fully hereinafter.

Figure 3:
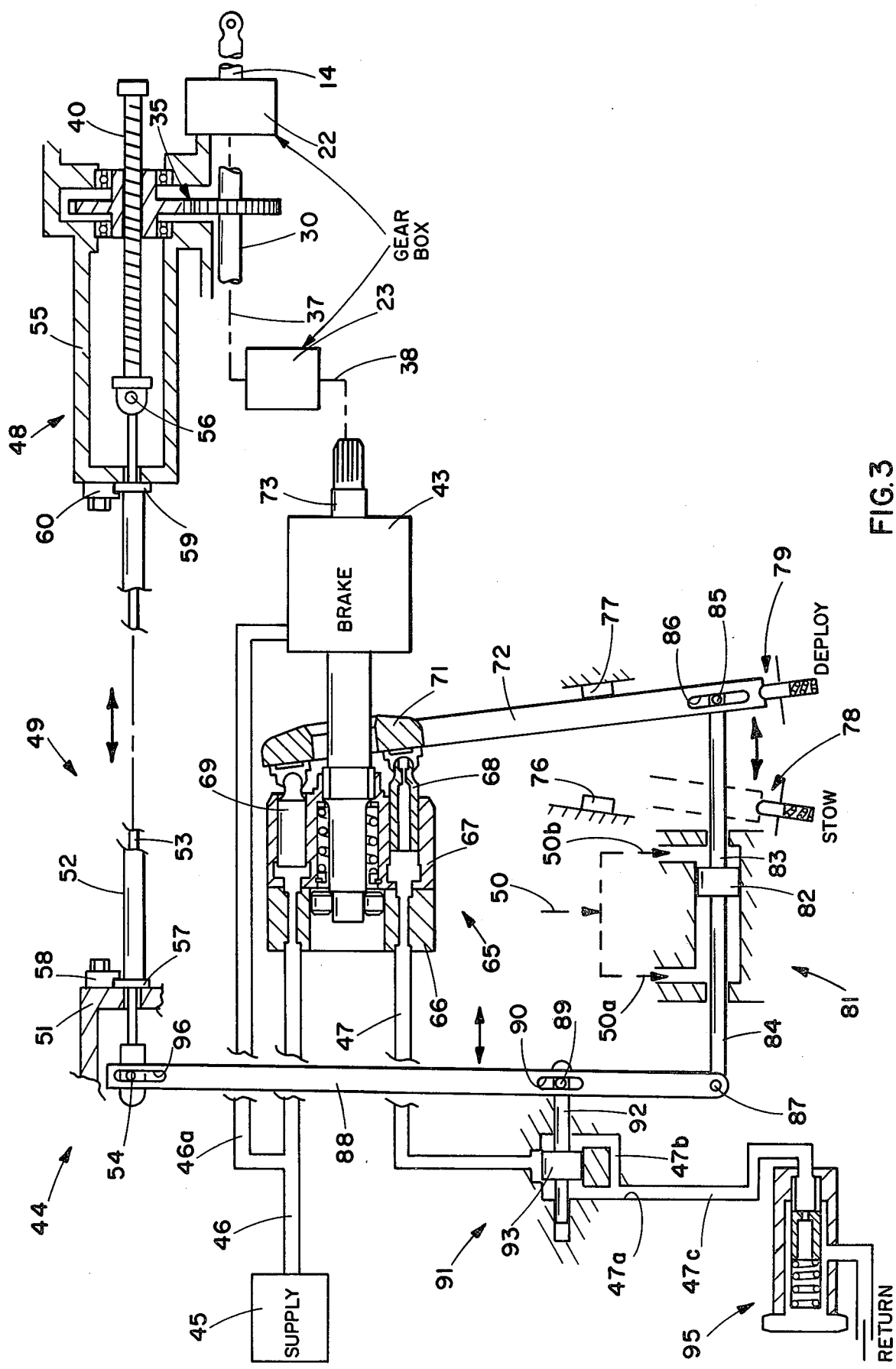
FIG. 3 is a schematic automatic rigging arrangement embodying the invention with certain components shown in central vertical section.

Reference is now made to FIG. 3 which includes a detailed illustration of the essential components to practice the invention. The major components are as follows. A power drive unit (PDU) generally indicated by the reference numeral 44; a feedback cable assembly 49; an actuator feedback mechanism 48; an over center, axial piston, variable displacement wobbler controlled hydraulic motor 65; a wobbler actuator piston assembly 81; a signal summing link 88; a snubbing valve 91; and finally a discharge flow regulating valve 95.

The hydraulic motor 65 is of a conventional design and includes such basic components as a port plate 66, coupled as shown to cylinder block 67 in which cylinder block 67 are axial pistons 68 and 69. The axial pistons 68 and 69 are cooperatively coupled as shown to a wobbler 71 which has a wobbler control arm 72. The wobbler control arm 72 is moveable between two positions, namely "deploy" and "stow". FIG. 3 shows a control arm in the deploy commanded position. Movement of the wobbler control arm 72 is dependent upon a fluid signal delivered as shown via broken line 50 and either arrow 50a or 50b. Fluid under pressure entering as shown at 50a forces the piston 82 to the right and causes piston rods 83 and 84 to be displaced to the right as shown. On either side of the wobbler control arm 72 are shown wobbler control stops 76 and 77.

The motor 65 receives fluid under pressure from supply 45 via conduit 46. Fluid leaving the motor 65 is communicated via conduit 47 to a snubbing valve 91 and thence via either conduit 47a or 47b and 47c to discharge flow regulating valve 95. The motor 65 has a power drive unit output shaft 73 which is coupled via flexible shaft 38, actuator gear head 23, flexible shaft 37 to gear shaft 30 of actuator feedback mechanism 48. A spur gear arrangement 35 transmits rotary motion to reciprocating feedback screw 40. The feedback screw 40 is connected via a pin 56 to an inner member 53 of feedback cable assembly 49. The feedback cable assembly 49 has an outer member secured at one end by a flange 57 integral with the outer member 52, and a clamp 58 to the PDU housing 51. The other end of the outer member has integral therewith a flange 59 which is secured to an actuator feedback housing 55 by a clamp 60. The other end of the inner member 53 has a pin 54 secured thereto. The pin 54 cooperates with a slot 96 in the elongated member or summing link 88. The elongated member or summing link 88 receives a feedback signal from the inner member 53, which is representative of the actual position of the ballscrew actuator 14. The bottom of the summing link 88 is pivotally secured by a pin 87 to piston rod 84, and receives via movement of the pin 87, an input signal indicative of the commanded position which is either "deploy" or "stow".

The snubbing valve 91 receives as its input the output of the summing link 88, which output is delivered via the cooperative action of a pin 89 secured to rod 92 and elongated slot 90 of summing link 88. Reciprocating movement of the rod 92 causes valve land 93 to move and thereby control the flow of return hydraulic fluid in conduit 47 on its way to the discharge flow regulating valve 95. The discharge flow regulating valve 95 is of conventional design and controls the maximum speed at which the motor 65 may operate.

In operation, a command to stow is executed when a hydraulic fluid signal is delivered as shown by arrows 50, 50b to the wobbler actuator piston assembly 81 causing the piston 82 to move instantly to the left. This movement to the left will cause the pin 87 of the rod 84 to move to the left also. This rapid movement to the left will translate into a simultaneous movement of snubbing valve land 93 to the left, thereby allowing return hydraulic fluid in conduit 47 to pass into conduit 47b, 47c and through discharge valve 95. It should be noted that the over center movement of the wobbler control actuator 72 results in the reversal of direction of the motor 65 and therefore causes a reversal in the PDU shaft 73, which in turn causes the actuator 14 to be driven towards a stowed condition. The movement of the actuator output 14 is directly mechanically translated via the spur gear arrangement 35, the feedback screw 40, and the inner member 53 of the feedback cable assembly 49 to the pin 54 and the summing link 88 with its slot 96.

It should be recognized that by design the invention contemplates that the pin 54 secured to the inner member 53 will move through a substantial physical distance, for example, 3 inches. During the initial 90% of its travel, the snubbing valve land 93 will allow fluid to pass thereby relatively unrestricted. As the pin 54 moves through the last 10% of the travel dictated by feedback movement of the inner member 53, the summing valve land 93 begins to restrict the passage of the return fluid in conduit 47 and its movement through conduits 47b and 47c to regulator valve 95. This restricting action of the snubbing valve land 93 causes the hydraulic motor to reduce the speed of the PDU shaft 73 and bring the ballscrew actuator output 14 to a soft stop.

It was noted earlier in respect of FIG. 1 that there could be included a feedback cable assembly identically coupled between the PDU 44 and the actuator gear head 26. When the second feedback arrangement is in place and the right hand "C" duct 12 is not in the same position as the left "C" duct 11, the inner member of the not shown feedback cable assembly would have to be moved until it physically would cooperate with the summing link 88 in the same manner to the feedback inner member 53 does, as shown in FIG. 3. This adjustment would insure that both the left and right "C" ducts 11 and 12 moved in synchronization.

Although this invention has been illustrated and described in connection with the particular embodiment illustrated, it will be apparent to those skilled in the art that various changes may be made therein without departing from the spirit of the invention as set forth in the appended claims.

I claim:

1. An automatic rigging arrangement for an actuation system which includes a power drive means having an output mechanically coupled to an actuator mounted in a position remote from a location of said power drive means, and as a power drive control means is controllingly coupled to said power drive means to cause said power drive means to move said power drive means output to a given position commanded, said automatic rigging arrangement including in combination:

a differential length feedback means having a moveable inner member and an outer member, said outer member secured at its ends respectively to said power drive means and said actuator, said moveable inner member controllingly coupled to said power drive control means and secured to an actuator position feedback member of said actuator to thereby provide via said moveable member an actuator position feedback input signal to a signal summing means associated with said power drive control means, said feedback input signal proportional to an actuator position, said signal summing means responsively coupled to said power drive means to receive as an input a signal representative of said given position commanded, said signal summing means having an output that is a function of said signal representative of said position commanded and said feedback signal, said signal summing means output controlling said power drive means to thereby control said power drive means and therefore said actuator irrespective of said actuator and its mounting position in respect of said location position of said power drive means.

2. The automatic rigging arrangement of claim 1 wherein said power drive means is a motor.

3. The automatic rigging arrangement of claim 2 wherein said motor is a variable displacement hydraulic motor.

4. The automatic rigging arrangement of claim 3 wherein said motor is of the axial piston type.

5. The automatic rigging arrangement of claim 4 wherein said variable displacement axial piston type motor is a two displacement over center wobbler controlled motor.

6. The automatic rigging arrangement of claim 5 wherein hydraulic fluid under pressure is delivered to said two displacement over center wobbler controlled motor via a snub control valve that is controllingly coupled to said signal summing means output to thereby control the flow of hydraulic fluid to said motor in direct response to said signal summing means output.

7. The automatic rigging arrangement of claim 6 wherein said signal summing means is comprised of an elongated member coupled at one end to said moveable member to receive said actuator feedback input signal, another end of said elongated member receiving said input signal representative of said given position commanded, said elongated member controllingly coupled at a point intermediate its ends to said snub control valve to provide said signal summing means output to said snub control output and thereby control said power drive motor as a function of said position commanded and said feedback signal.

* * * * *